United States Patent [19]

Burgdorf

[11] 4,351,420
[45] Sep. 28, 1982

[54] SLIDING GUIDE FOR A FLOATING CALIPER DISC BRAKE

[75] Inventor: Jochen Burgdorf, Offenbach, Fed. Rep. of Germany

[73] Assignee: ITT Industries, Inc., New York, N.Y.

[21] Appl. No.: 169,682

[22] Filed: Jul. 17, 1980

[30] Foreign Application Priority Data

Aug. 24, 1979 [DE] Fed. Rep. of Germany ....... 2934219
Sep. 26, 1979 [DE] Fed. Rep. of Germany ....... 2938926

[51] Int. Cl.³ .................................... F16D 65/02
[52] U.S. Cl. ......................... 188/73.45; 188/73.33
[58] Field of Search ............... 188/72.4, 73.31–73.34, 188/73.42–73.45, 73.47

[56] References Cited

U.S. PATENT DOCUMENTS 3,682,277 8/1972 Brown .................... 188/73.45
4,200,173 4/1980 Evans et al. ............. 188/73.45

*Primary Examiner*—Duane A. Reger
*Attorney, Agent, or Firm*—John T. O'Halloran; Alfred C. Hill

[57] ABSTRACT

The sliding guide for a floating caliper disc brake comprises, at one side of the brake disc, two axially extending pins secured to the brake support and projecting through elastic bushings inserted in guide holes in the brake caliper and, at the other side of the disc, there are provided projections at the ends of the brake support arms extending over the edge of the disc, one projection holding the caliper radially outwardly and the other projection holding the caliper radially inwardly. Thus, the caliper is guided in a definite position without jamming.

28 Claims, 2 Drawing Figures

SLIDING GUIDE FOR A FLOATING CALIPER DISC BRAKE

BACKGROUND OF THE INVENTION

This invention relates to a sliding guide for a floating caliper of a disc brake, in particular for automotive vehicles, wherein a brake support member has four surfaces spaced from each other to guide the caliper in an axial direction, and wherein the caliper bears against a first pair of the four guiding surfaces radially from the inside and against a second pair of the four guiding surfaces radially from the outside.

In a known sliding guide of this type, as shown, for example, in German Patent DE-OS No. 2,408,519, grooves are provided in the lateral ends of the caliper which are engaged axially by spaced, prismatic guiding pins fastened to arms of the brake support member. A clip spring bearing against the brake support member acts on the caliper in a radial direction such that on the one side of the brake disc the radially outer groove walls, and on the other side of the brake disc the radially inner groove walls of the caliper are in abutment with the guiding pins. Between the opposite groove walls and the guiding pins, a clearance is provided such that contamination and corrosion cannot impair the slidability of the caliper. Although in a radial direction the caliper is supported at the brake support member by four surfaces only, four further surfaces are provided which ensure a sufficient connection between the caliper and the brake support member in the event of a broken spring. In order to obtain an even abutment of the caliper with the original four guiding surfaces, two adjacent guiding surfaces of the known sliding guide are arranged at a relative angle such that the caliper is urged into a central position between these two surfaces by the action of the clip spring. This known sliding guide has proven to be effective in practice, its manufacture, however, is still expensive.

Further, a sliding guide for the caliper of a floating caliper disc brake is known, as shown, for example, in German Patent DE-OS No. 2,124,030, wherein the one caliper end receiving the brake-actuating device has guide bores sliding on pins arranged parallel to the axis and formed fast with the brake support member, and the other end of the caliper is in positive engagement with a brake shoe guided axially slidably in the brake support member. Rubber bushings are inserted between the pins and the guide bores. However, the elasticity of the rubber bushings is not sufficient to prevent rattling of the brake shoe guiding the other caliper end. Therefore, additional springs are necessary between brake support member and caliper to clamp the two members relative to each other.

SUMMARY OF THE INVENTION

It is an object of the present invention to simplify a sliding guide of the type initially referred to and to improve upon its effect.

A feature of the present invention is the provision of a sliding guide for a floating caliper of a disc brake comprising: a brake support member having two spaced arms extending over the periphery of a brake disc; the support member having on one side of the disc first and second guide surfaces parallel to the rotational axis of the disc and spaced with respect to each other to axially guide one end of the caliper, the caliper embracing the disc, one of the first and second guide surfaces exerting a first inwardly directed holding force on the caliper and the other of the first and second guide surfaces exerting a first outwardly directed holding force on the caliper; and the support member having on the other side of the disc in each of the two arms a different one of third and fourth guide surfaces parallel to the rotational axis of the disc to axially guide the other end of said caliper, one of the third and fourth guide surfaces exerting a second inwardly directed holding force on the caliper and the other of the third and fourth guide surfaces exerting a second outwardly directed holding force on the caliper; the one of the first and second guide surfaces and the other of the third and fourth guide surfaces are disposed on one side of the rotational axis of the disc and the other of the first and second guide surfaces and the one of the third and fourth guide surfaces are disposed on the other side of the rotational axis of the disc such that a combined inwardly directed holding force is exerted on the caliper along a first line interconnecting the one of the first and second guide surfaces and the one of the third and fourth guide surfaces and a combined outwardly directed holding force is exerted on the caliper along a second line crossing but not intersecting the first line and interconnecting the other of the first and second guide surfaces and the other of the third and fourth guide surfaces.

Thus, according to the present invention a sliding guide is provided which requires only four guiding surfaces for alignment of the caliper in a radial plane extending across the brake disc at an angle and the axial distance between the guiding surfaces may be a multiple of their axial length. This advantageously permits dimensioning the guiding surfaces relatively small, resulting in a reduced susceptibility to corrosion of the sliding guide. It is another advantage of the present invention that three guiding surfaces suffice to support the caliper in a radial direction so that the guide cannot become jammed. The clearance between the caliper and the guiding surfaces may be dimensioned such that only a small force is required for displacement of the caliper.

It is another advantage of the sliding guide of the present invention that forces transmitted from the brake shoes to the caliper during braking and tending to turn the caliper about its longitudinal axis can be effectively received by the guiding surfaces. This prevents the caliper from becoming disengaged from its guide at the brake support member.

A low load on the sliding guide applied by the inertial forces occurring at the caliper during radial accelerations is achieved in a particularly advantageous manner by arranging for the crossing point of the two connecting lines to lie in the proximity of the caliper's center of gravity. In order to ensure this condition in any operating position of the caliper, the present invention provides for the guiding surfaces to be arranged at projections on the caliper which are in abutment with sliding surfaces of the brake support member extending axially over the projections. To guide the caliper in a circumferential direction, it will be an advantage to provide further surfaces which are substantially radially aligned and parallel to the axis.

Preferably, an elastic sliding element is inserted at a guiding surface between brake caliper and brake support member. Thereby the caliper is resiliently urged against the remaining guiding surfaces of the brake support member so that rattling noise is avoided.

In a preferred embodiment of this invention, two guiding surfaces are formed by pins aligned parallel to the brake disc axis and engaging guide bores. A sliding guide of this type permits ease of manufacture and adaptation of the brake design to the individual conditions of installation in the vehicle with regard to space. The guide bores preferably accommodate elastic bushings sliding on the pins without clearance. In this arrangement, the elastic bushings compensate for manufacturing tolerances and cause a defined elastic clamping of the caliper relative to the brake support member which counteracts vibrations and rattling noise. It will be another advantage to screw the pins into the brake support member mounted to the vehicle remote from the brake disc and to have them extend on either side of the actuating device which is situated in the brake caliper. In that case, the caliper is suitably in direct abutment with guiding members of the brake support member on the opposite side of the brake disc.

If one brake shoe is directly supported in the caliper so that the brake torque of this brake shoe is taken up by the caliper, it will be particularly advantageous according to another embodiment of the present invention if two guiding surfaces are located on the side of the brake disc close to that brake shoe and if the guiding surfaces have adjacent supporting surfaces to take up the brake torque, with the caliper bearing against the guiding surfaces radially from the inside on the brake disc entry side and radially from the outside on the brake disc exit side. It is thereby achieved that during a braking action the caliper is urged into engagement with the guiding surfaces by the torque forces at the brake shoe supported in the caliper, thereby ensuring a safe support of the caliper in the brake support member.

Assembly and disassembly of the caliper in a radial direction is advantageously simplified by providing a guiding surface against which the caliper bears radially from the inside at a member which is detachably connected with the brake support member. It will be a particular advantage herein to provide one or two guiding surfaces at a brake shoe detachably connected with the caliper in a manner preventing relative rotational movement.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
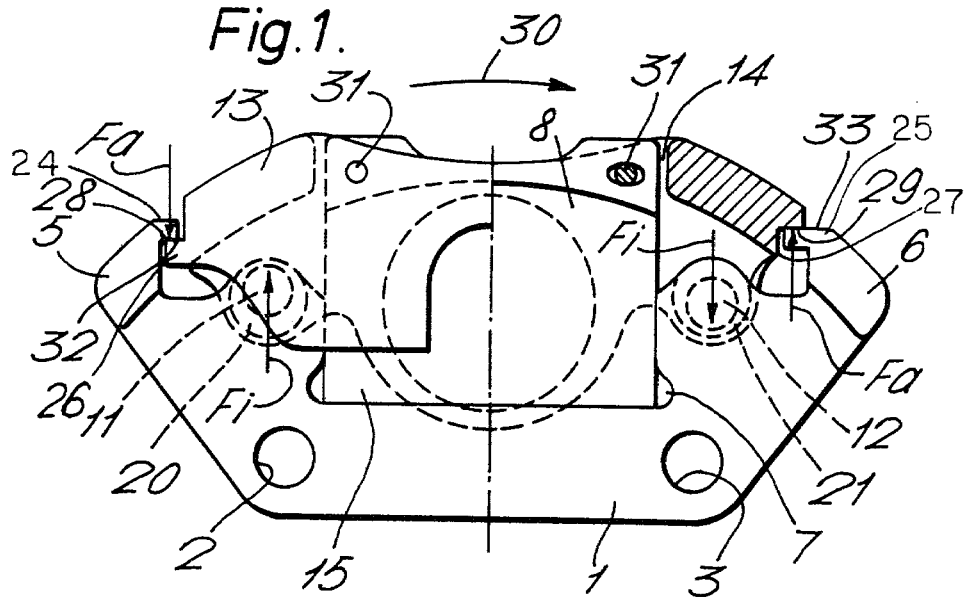
FIG. 1 is a front view, partially in section, of a floating caliper spot type disc brake in accordance with the principles of the present invention, without the brake disc.
Figure 2:
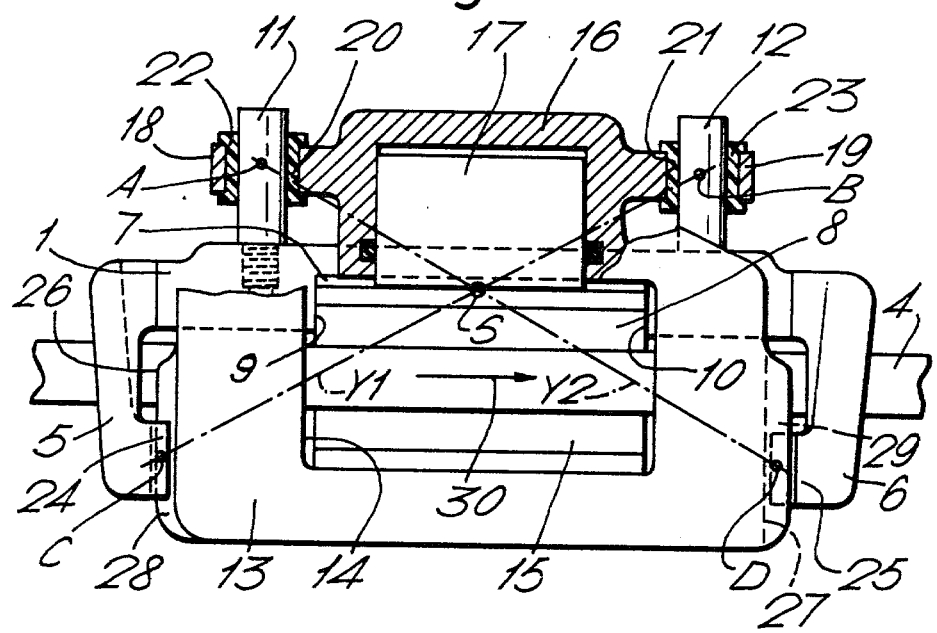
FIG. 2 is a top plan view, partially in section, of the brake of FIG. 1, including an illustration of the brake disc.

Referring to FIGS. 1 and 2, the floating caliper spot type disc brake of the present invention comprises a brake support member 1 with supporting openings 2 and 3 which serve to fasten brake support member 1 to a steering knuckle, or another component of the wheel suspension of a vehicle. Brake support member 1 extends along one side of a brake disc 4 and carries at its tangential ends arms 5 and 6 projecting over the periphery of brake disc 4. On the side close to brake disc 4, brake support member 1 has a radially outwardly open guide 7 into which a brake shoe 8 is inserted which bears against walls 9 and 10 of guide 7 in the circumferential direction.

On the side remote from the brake disc, brake support member 1 has pins 11 and 12 aligned parallel to the axis of rotation of brake disc 4 and fastened to brake support member 1 by means of a detachable threaded connection.

A caliper 13 is arranged between arms 5 and 6 of brake support member 1. Caliper 13 embraces the periphery of brake disc 4 and has in its central portion a radial opening 14 permitting assembly and disassembly of brake shoe 8 and of a second brake shoe 15 fastened to caliper 13. On the side adjacent to brake support member 1, caliper 13 has formed therein an actuating cylinder 16 in which a piston 17 is slidably arranged and abuts with its end extending out of the actuating cylinder against brake shoe 8. On either side of actuating cylinder 16, caliper 13 is provided with flanges 18 and 19 having bores 20 and 21 into which pins 11 and 12 of brake support member 1 extend. The diameter of bores 20 and 21 is greater than the diameter of pins 11 and 12, and bushings 22 and 23 made of an elastic material are inserted into the space between bores 20 and 21 and pins 11 and 12. Bushings 22 and 23 embrace with their thickened ends flanges 18 and 19 whereby they are secured against axial displacement relative to caliper 13.

On the opposite side of brake disc 4, caliper 13 is guided at the ends of arms 5 and 6 provided with projections 24 and 25. For this purpose, caliper 13 has at its lateral ends radially aligned surfaces 26 and 27. With surface 26, caliper 13 abuts against projection 24 of arm 5, and with surface 27 against projection 25 of arm 6. When the brake is applied, the torque force acting on brake shoe 15 will be transmitted to the brake support member through surfaces 26 and 27, depending on the direction of brake disc rotation. To provide a support in a radial direction, caliper 13 further has tangentially aligned surfaces 28 and 29 which engage with surfaces 32 and 33 at projections 24 and 25. With surface 28, caliper 13 abuts against projection 24 radially from the inside, and with surface 29, caliper 13 abuts against projection 25 radially from the outside. The main direction of rotation of the brake disc, which corresponds to a forward driving direction if the brake is mounted in a vehicle, is identified by an arrow 30. To secure brake shoes 8 and 15 in the disc brake, retaining pins 31 are provided which extend through openings in the backing plates of brake shoes 8 and 15 and are held in bores in caliper 13. For purposes of simplicity, retaining pins 31 are not shown in FIG. 2.

In the embodiment described, the sliding support of caliper 13 on brake support member 1 is provided at points A and B on pins 11 and 12, respectively, and at points C and D on projections 24 and 25 of arms 5 and 6. In this arrangement, brake support member 1 exerts the oppositely directed holding forces on caliper 13 illustrated by vectors Fi and Fa in FIG. 1. As a result of the opposed arrangement of surfaces 28 and 29, radially inwardly directed holding forces act on points B and C connected by line Y 1, and radially outwardly directed holding forces act on points A and D connected by line Y 2. In FIG. 2, the crossing point of the lines Y 1 and Y 2 lies in the caliper's center of gravity S. As a result of this arrangement, inertial forces acting in a radial direction on caliper 13 are taken up substantially by the holding forces present on connecting lines Y 1 and Y 2, respectively, so that tilting of the caliper in its guidings is largely avoided.

Elastic bushings 22 and 23 embrace pins 11 and 12 on all sides. In a radial direction, however, bushings 22 and 23 effect a support mainly with their area lying at the tip of vectors Fi.

In order to clamp caliper 13 relative to its guidings and thereby keep it from rattling, pins 11 and 12 are eccentrically arranged relative to bores 20 and 21 in a radial direction. Relative to the center of bore 20, pin 11 is located radially outwardly, while pin 12 is located radially inwardly relative to the center of bore 21. Thereby elastic bushings 22 and 23 are compressed unilaterally so that a torque acting clockwise in FIG. 1 is applied to caliper 13, urging caliper surfaces 28 and 29 into engagement with projections 24 and 25. Thereby disengagement of surfaces 28 and 29 from projections 24 and 25 is prevented. Further, the friction between surfaces 28 and 29 and projections 24 and 25 damps caliper vibrations in the circumferential direction.

With the main direction of brake disc rotation indicated (arrow 30), it is suitable to arrange surfaces 28 and 29 in the manner illustrated because thereby a torque acting clockwise in FIG. 1 and applied to the caliper by the torque force acting on brake shoe 15 during braking can be directly transmitted to brake support member 1 and will not cause an uncontrolled movement of caliper 13 relative to brake support member 1.

It is also within the scope of the present invention to substitute another type of sliding guide with plane sliding surfaces for pin guides 11 and 12. It will be perfectly sufficient in this arrangement if caliper 13 has a guiding surface radially inwardly in the area of pin 11 and another guiding surface radially outwardly in the area of pin 12.

Caliper 13 is disassembled from brake support member 1 by unfastening threaded pins 11 and 12. Then caliper 13 can be raised at point D together with brake shoes 8, 15 and can be displaced to the right until surfaces 28 and 32 are out of engagement. Then caliper 13 is lifted off brake support member 1 radially. Assembly takes place in the reverse order.

While I have described above the principles of my invention in connection with specific apparatus it is to be clearly understood that this description is made only by way of example and not as a limitation to the scope of my invention as set forth in the objects thereof and in the accompanying claims.

I claim:
1. A sliding guide for a floating caliper of a disc brake comprising:
a brake support member having two spaced arms extending over the periphery of a brake disc;
said support member having on one side of said disc first and second guide surfaces parallel to the rotational axis of said disc and spaced with respect to each other to axially guide one end of said caliper, said caliper embracing said disc, one of said first and second guide surfaces exerting a first inwardly directed holding force on said caliper and the other of said first and second guide surfaces exerting a first outwardly directed holding force on said caliper; and
said support member having on the other side of said disc in each of said two arms a different one of third and fourth guide surfaces parallel to the rotational axis of said disc to axially guide the other end of said caliper, one of said third and fourth guide surfaces exerting a second inwardly directed holding force on said caliper and the other of said third and fourth guide surfaces exerting a second outwardly directed holding force on said caliper;
said one of said first and second guide surfaces and said other of said third and fourth guide surfaces are disposed on one side of the rotational axis of said disc and said other of said first and second guide surfaces and said one of said third and fourth guide surfaces are disposed on the other side of the rotational axis of said disc such that a combined inwardly directed holding force is exerted on said caliper along a first line interconnecting said one of said first and second guide surfaces and said one of said third and fourth guide surfaces and a combined outwardly directed holding force is exerted on said caliper along a second line crossing but not intersecting said first line and interconnecting said other of said first and second guide surfaces and said other other of said third and fourth guide surfaces.

2. A guide according to claim 1, wherein said crossing of said first and second lines is approximately at the center of gravity of said caliper.

3. A guide according to claim 2, wherein said caliper includes lateral surfaces which are in abutment with each of said third and fourth guide surfaces.

4. A guide according to claim 3, wherein said caliper includes radially aligned surfaces parallel to the rotational axis of said disc to guide said caliper on each of said two arms.

5. A guide according to claim 4, further including an elastic sliding element disposed between said support member and said caliper at certain ones of said first, second, third and fourth guide surfaces.

6. A guide according to claim 2, wherein each of said first and second guide surfaces includes a pin disposed parallel to the rotational axis of said disc and slidably engaging a guide bore in said caliper.

7. A guide according to claim 6, wherein each of said guide bores has disposed therein an elastic bushing without clearance in which the associated one of said pins slide.

8. A guide according to claim 7, wherein each of said bushings are preloaded in an opposite radial direction by disposing the associated one of said pins in its associated one of said guide bores eccentrically.

9. A guide according to claims 6, 7 or 8 wherein each of said pins are threaded into said support member on opposite sides of an actuating device carried by said caliper.

10. A guide according to claim 2, wherein one brake shoe is directly supported by said other end of said caliper, and said third and fourth guide surfaces are disposed adjacent said one brake shoe with said one of said third and fourth guide surfaces being disposed on a disc entry side of said brake and said other of said third and fourth guide surfaces being disposed on a disc exit side of said brake, each of said third and fourth guide surfaces having adjacent supporting surfaces to receive braking torque.

11. A guide according to claim 2, wherein each of said first and second guide surfaces are detachably connected to said support member.

12. A guide according to claim 2, wherein each of said third and fourth guide surfaces are provided adjacent a brake shoe detachably connected to said other end of said caliper cooperating with surfaces of said caliper to prevent relative rotation of said caliper and said support member.

13. A guide according to claim 2, wherein
each of said first and second guide surfaces are pins fastened to said support member remote from said disc.

14. A guide according to claim 1, wherein
said caliper includes lateral surfaces which are in abutment with each of said third and fourth guide surfaces.

15. A guide according to claim 14, wherein
said caliper includes radially aligned surfaces parallel to the rotational axis of said disc to guide said caliper on each of said two arms.

16. A guide according to claim 15, further including an elastic sliding element disposed between said support member and said caliper at certain ones of said first, second, third and fourth guide surfaces.

17. A guide according to claim 1, wherein
said caliper includes radially aligned surfaces parallel to the rotational axis of said disc to guide said caliper on each of said two arms.

18. A guide according to claim 17, further including an elastic sliding element disposed between said support member and said caliper at certain ones of said first, second, third and fourth guide surfaces.

19. A guide according to claim 2, further including an elastic sliding element disposed between said support member and said caliper at certain ones of said first, second, third and fourth guide surfaces.

20. A guide according to claim 1, further including an elastic sliding element disposed between said support member and said caliper at certain ones of said first, second, third and fourth guide surfaces.

21. A guide according to claim 1, wherein
each of said first and second guide surfaces includes a pin disposed parallel to the rotational axis of said disc and slidably engaging a guide bore in said caliper.

22. A guide according to claim 21, wherein
each of said guide bores has disposed therein an elastic bushing without clearance in which the associated on of said pins slide.

23. A guide according to claim 22, wherein
each of said bushings are preloaded in an opposite radial direction by disposing the associated on of said pins in its associated one of said guide bores eccentrically.

24. A guide according to claims 21, 22 or 23, wherein
each of said pins are threaded into said support member on opposite sides of an actuating device carried by said caliper.

25. A guide according to claim 1, wherein
one brake shoe is directly supported by said other end of said caliper, and said third and fourth guide surfaces are disposed adjacent said one brake shoe with said one of said third and fourth guide surfaces being disposed on a disc entry side of said brake and said other of said third and fourth guide surfaces being disposed on a disc exit side of said brake, each of said third and fourth guide surfaces having adjacent supporting surfaces to receive braking torque.

26. A guide according to claim 1, wherein
each of said first and second guide surfaces are detachably connected to said support member.

27. A guide according to claim 1, wherein
each of said third and fourth guide surfaces are provided adjacent a brake shoe detachably connected to said other end of said caliper cooperating with surfaces of said caliper to prevent relative rotation of said caliper and said support member.

28. A guide according to claim 1, wherein
each of said first and second guide surfaces are pins fastened to said support member remote from said disc.

* * * * *